US010655721B2

(12) United States Patent
Kobayashi

(10) Patent No.: US 10,655,721 B2
(45) Date of Patent: May 19, 2020

(54) STRAIN WAVE GEARING

(71) Applicant: HARMONIC DRIVE SYSTEMS INC., Shinagawa-ku, Tokyo (JP)

(72) Inventor: Masaru Kobayashi, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 447 days.

(21) Appl. No.: 15/542,872

(22) PCT Filed: Jan. 13, 2015

(86) PCT No.: PCT/JP2015/050675
§ 371 (c)(1),
(2) Date: Jul. 11, 2017

(87) PCT Pub. No.: WO2016/113847
PCT Pub. Date: Jul. 21, 2016

(65) Prior Publication Data
US 2017/0370457 A1    Dec. 28, 2017

(51) Int. Cl.
  *F16H 57/04*   (2010.01)
  *F16H 49/00*   (2006.01)
  *F16H 1/32*    (2006.01)

(52) U.S. Cl.
  CPC ............. *F16H 49/001* (2013.01); *F16H 1/32* (2013.01); *F16H 57/041* (2013.01);
  (Continued)

(58) Field of Classification Search
  CPC .. F16H 49/001; F16H 57/0409; F16H 57/041; F16H 57/0427; F16H 57/0471; F16H 57/0486; F16H 57/0417
  (Continued)

(56) References Cited

U.S. PATENT DOCUMENTS 3,407,902 A * 10/1968 Musser .................. F16N 13/20
                                                  184/6.12
8,516,924 B2 * 8/2013 Pen ....................... F16H 49/001
                                                  74/640

(Continued)

FOREIGN PATENT DOCUMENTS

JP    60-091098 A    5/1985
JP    60-129545 U    8/1985
(Continued)

OTHER PUBLICATIONS

International Search Report (PCT/ISA/210) dated Apr. 7, 2015, by the Japanese Patent Office as the International Searching Authority for International Application No. PCT/JP2015/050675.
(Continued)

*Primary Examiner* — William C Joyce
(74) *Attorney, Agent, or Firm* — Buchanan Ingersoll & Rooney PC

(57) ABSTRACT

An internal contact part of a wave generator of a strain wave gearing, a contact part between an externally toothed gear and the wave generator, and tooth surface parts are lubricated by a lubricating fine powder. When the strain wave gearing is in operation, the lubricating fine powder is supplied to the internal contact part and the contact part by a first powder guide that rotates integrally with the wave generator. Having passed through these sections, the lubricating fine powder is supplied to the tooth surface parts by a second powder guide that rotates integrally with the wave generator. Each component part can be reliably lubricated regardless of the orientation of the strain wave gearing during operation.

8 Claims, 6 Drawing Sheets

(52) U.S. Cl.
 CPC ..... *F16H 57/0409* (2013.01); *F16H 57/0427* (2013.01); *F16H 57/0471* (2013.01); *F16H 57/0486* (2013.01); *F16H 57/0417* (2013.01)

(58) Field of Classification Search
 USPC .......................................................... 74/640
 See application file for complete search history.

(56) References Cited

U.S. PATENT DOCUMENTS 9,732,836 B2 * 8/2017 Su .......................... F16H 57/043
9,732,842 B2 * 8/2017 Huang ................. F16H 57/0427

FOREIGN PATENT DOCUMENTS

| | | | |
|---|---|---|---|
| JP | 07-018280 A | | 1/1995 |
| JP | 7-205899 | * | 8/1995 |
| JP | 2009-041747 A | | 2/2009 |
| JP | 2011-064304 A | | 3/2011 |
| JP | 2013-092217 A | | 5/2013 |

OTHER PUBLICATIONS

Written Opinion (PCT/ISA/237) dated Apr. 7, 2015, by the Japanese Patent Office as the International Searching Authority for International Application No. PCT/JP2015/050675.

* cited by examiner

STRAIN WAVE GEARING

TECHNICAL FIELD

The present invention relates to a strain wave gearing in which each portion is lubricated by lubricating powder filled inside.

BACKGROUND ART

Strain wave gearing are mainly lubricated by an oil and a grease. A strain wave gearing disclosed in Patent document 1 is provided with a mechanism for supplying a grease from a grease reservoir. In a strain wave gearing described in Patent document 2, an oil tank is arranged inside a cup-shaped externally toothed gear so that the oil tank rotates integrally with the externally toothed gear, and an oil is supplied to portions where lubrication is required by making use of centrifugal force. In a power transmission device disclosed in Patent document 3, for the purpose of reducing friction and wear between sliding members, sliding surfaces are set to have a prescribed surface roughness, and are coated with a carbon-based film, and grease lubrication is applied between the sliding surfaces coated with the carbon-based film.

PRIOR ART DOCUMENT

Patent Document

Patent document 1: JP 2013-92217 A
Patent document 2: JP 2011-64304 A
Patent document 3: JP 2009-41747 A

SUMMARY OF THE INVENTION

Problems to be Solved by the Invention

Strain wave gearings are usually used as a speed reduction device, in which a wave generator is rotated by a motor or the like at a high speed. In cases in which contact portions of a wave generator that contact an externally toothed gear and contact portions inside the wave generator are lubricated by an oil or a grease, viscus resistance loss due to high-speed rotation of the wave generator becomes large. This causes to reduce efficiency of the strain wave gearing in a low-load zone and a high-speed-rotation zone.

In order to solve these problems, the present inventor has proposed a strain wave gearing which is able to improve efficiency in a low-load zone and a high-rotation-speed zone by employing lubricating fine powders as a lubricant.

In a strain wave gearing employing lubricating fine powders, lubrication to respective portions by fine powders may not be maintained if the orientation of the strain wave gearing in operation is different or is changed during operation.

An object of the present invention is to provide a strain wave gearing having a mechanism for enabling to maintain lubrication performance by fine powders regardless of the orientation of the strain wave gearing during operation.

Specifically, an object of the present invention is to provide a strain wave gearing having a mechanism that can make sure to supply fine powders to portions to be lubricated. Further, an object of the present invention is to provide a strain wave gearing having a mechanism that can prevent or suppress fines powders from aggregating due to moisture absorption and from degradation of lubricating performance. Another object of the present invention is to provide a strain wave gearing having a mechanism that can prevent or suppress fine powders from adhering to portions other than those to be lubricated.

Means of Solving the Problems

In order to solve the above problems, a strain wave gearing of the present invention is characterized by including:

a rigid internally toothed gear;

a cup-shaped flexible externally toothed gear arranged coaxially inside the internally toothed gear;

a wave generator for flexing the externally toothed gear in a non-circular shape to partially mesh with the internally toothed gear, the wave generator being accommodated inside the externally toothed gear;

a lubricating powder filled in a compartment section enclosed by the externally toothed gear and the wave generator;

a first powder guide for rotating integrally with the wave generator in the compartment section to lead the lubricating powder in a direction toward an internal contact part of the wave generator and a contact part between the wave generator and the externally toothed gear; and a second powder guide for rotating integrally with the wave generator to lead the lubricating powder that moves, after passed through the wave generator from the compartment section, in a direction toward tooth surface parts of the externally toothed gear and the internally toothed gear.

When the strain wave gearing is in operation, the first powder guide rotates integrally with the wave generator in a state being contacted with the lubricating powder. The lubricating powder is made to flow by the rotating first powder guide, and is guided in a direction toward a first lubrication portion (an internal contact part of the wave generator) and a second lubrication portion (a contact part between the wave generator and the externally toothed gear). Whereby, the lubricating powder is reliably supplied to these lubrication portions. Further, a part of the lubricating powder supplied to these lubrication portions passes through these lubrication portions and moves to the side of the second powder guide. Since the second powder guide is rotating integrally with the wave generator, the lubricating powder that has passed through the wave generator is guided along the second powder guide to the outer circumferential side by the centrifugal force, and is led toward a third lubrication portion (the tooth surface parts of the externally toothed gear and the internally toothed gear). Accordingly, it is possible to reliably supply the lubricating powder to each lubrication portion against the gravity, the lubricating powder being accumulated in such portions of the compartment section that becomes lower side in the direction of gravity according to the orientation of the strain wave gearing.

Here, it is desirable that the first powder guide has a fixed part that is fixed to an inner-side end-face portion of the wave generator facing the compartment section, and a tubular body part extending coaxially in a direction of a device center axis line, wherein the tubular body part opens on both sides in the direction of the device center axis line, and has a shape of a circular truncated cone that spreads outward in a radial direction as it approaches the inner-side end-face portion, and wherein each of an inner circumferential surface and an outer circumferential surface of the tubular body part is, at least in part thereof, in contact with the lubricating powder in the compartment section.

When the tubular body part having a circular truncated cone shape is rotated, the lubricating powder is moved by the centrifugal force toward the first and second lubrication portions along the inner circumferential surface of the tubular body part. In addition, the lubricating powder flows in the circumferential direction along the outer circumferential surface of the tubular body part; and the flowing lubricating powder is moved toward the first and second lubrication portions along the inner circumferential surface of the externally toothed gear, by means of the difference in speed between the outer circumferential surface and the inner circumferential surface of the externally toothed gear located at the outer peripheral side of the outer circumferential surface. Accordingly, the lubricating powder can be reliably supplied to the first and second lubrication portions.

When the first powder guide is provided with a tubular body part of a circular truncated cone shape, it is desirable that the circular truncated cone shape of the tubular body part is defined so that the apex angle is in the range of 10 degrees to 30 degrees. The reason for making it 10 degrees or more is that the lubricating powder having a small apparent specific gravity can reliably be moved along the cone-shaped inner circumferential surface by making use of the centrifugal force. In addition, the reason for making it 30 degrees or less is that, in the consideration of the angle of repose of the fine lubricating powder, the lubricating powder is allowed to slide down along the cone-shaped inner circumferential surface of the tubular body part by the gravity.

In addition, it is desirable that a plurality of convex parts or a plurality of concave parts are formed in the outer circumferential surface of the tubular body part. For example, by forming shallow grooves at prescribed pitches in the circumferential direction in the outer circumferential surface, it is possible to intensify the flow of the lubricating powder formed between this outer circumferential surface and the inner circumferential surface of the externally toothed gear.

On the other hand, the wave generator is usually provided with a rigid plug and a wave-generator bearing mounted on a plug outer circumferential surface having a non-circular profile of the plug. The first lubrication portion (the internal contact part of the wave generator) includes contact portions among component parts of the wave-generator bearing. In this case, it is possible to use a disc-shaped member fixed coaxially to the plug as the second powder guide. The second powder guide of this shape may be provided with an outer-peripheral-side guide-plate portion that faces the wave-generator bearing from the opposite side of the compartment section in the direction of the device center axis line, and an inner-peripheral-side fixed plate portion that is fixed to the plug.

In this case, it is desirable that the guide-plate portion of the second powder guide is arranged, in the direction of the device center axis line, between the wave-generator bearing and an annular end surface formed on a fixed-side member to which the internally toothed gear is fixed, and that a part of the guide-palate portion is arranged in contact with the annular end surface in a slidable manner. Whereby, it is possible to prevent the lubricating powder from leaking outside. For example, in a case where the wave generator is connected to an input shaft such as a motor rotational shaft, it is possible to prevent the lubricating powder from leaking out into the side of the input shaft.

Next, in the strain wave gearing of the present invention, it is desirable that a heater for dehumidifying the lubricating powder in the compartment section where the lubricating powder is accumulated so as to prevent or suppress aggregation of the lubricating powder and degradation of the lubricating performance thereof due to moisture absorption.

In addition, it is desirable that, except for the internal contact part, the contact part and the tooth surface parts, at least a part of the front surface portion which is exposed to the lubricating powder is coated with a powder adhesion prevention coating.

Incidentally, the lubricating powder of the present invention is inorganic lubricating powders having a prescribed particle diameter and a prescribed hardness, and having a lamellar crystal structure. The lubricant powder, during the operation of the strain wave gearing, is crushed between the contact surfaces of each of the contact parts, and is moved to adhere to the both contact surfaces of each contact part, thereby forming thin surface films thereon. Additionally, the powder is thinly spread by pressure and reduced into finer particles to change into a shape which facilitates intrusion into the inside parts (the space between the contact surfaces) of the contact parts.

By both the fine particles having changed in shape and the thin surface films formed on the both contact surfaces, the lubrication of each contact part is maintained. Since neither the thin surface films moved and adhered on the contact surfaces nor the fine particles subdivided via spread by pressure are viscous, it is possible to realize a high efficiency in the low-load region and the high-speed rotation region of the strain wave gearing. Further, since the change in efficiency due to operational conditions is thus reduced, the controllability of the strain wave gearing is also enhanced.

In order to obtain a desired lubricating effect and realize a smooth rotation of the wave generator, it is desirable to use fine particles having an average particle diameter of 15 μm or less as the lubricating powder. It is also desirable that the lubricating powder is a soft particle having a Mohs hardness of 1.5 or less.

In particular, in order to exert a lubricating effect from the initial operational stage of the strain wave gearing so as to realize a smooth rotation of the wave generator, it is desirable to use fine particles obtained by crushing the lubricating powders into a flaky state via spreading by pressure.

As the lubricating powders having a lamellar crystal structure, it is possible to use any one of molybdenum disulfide, disulfide tungsten, graphite, and boron nitride. Molybdenum disulfide and graphite have a lamellar crystal structure referred to as a hexagonal crystal, and boron nitride has a flaky crystal structure. It is also possible to use a combination of two or more lubricating powders selected from among the above materials.

MODE FOR CARRYING OUT THE INVENTION

Embodiments of a strain wave gearing to which the present invention is applied will be described below with reference to the drawings.

Figure 1:
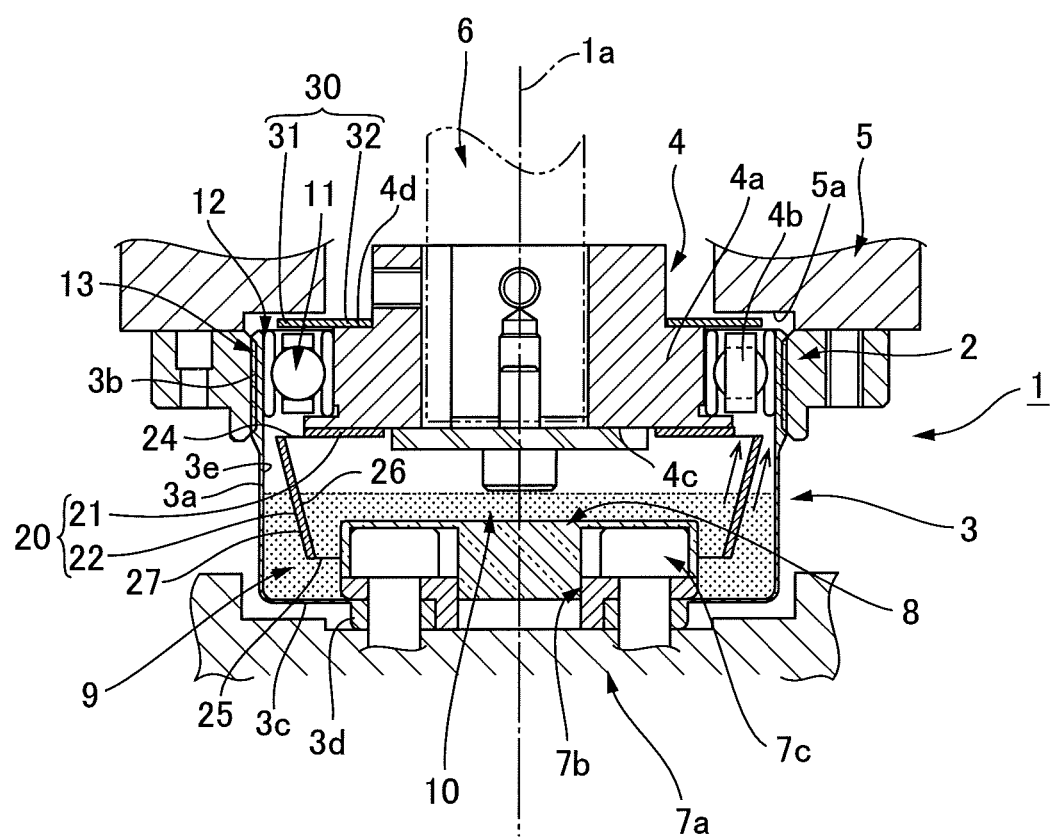
FIG. 1 is a schematic longitudinal sectional view showing an example of a strain wave gearing to which the present invention is applied, and showing a state of an upright orientation in which the device center axis line is oriented in the vertical direction so that the wave generator is located at the upper side.

FIG. 1 is a schematic longitudinal sectional view showing an example of a strain wave gearing to which the present invention is applied. The strain wave gearing 1 is called a cup type, and is provided with an annular rigid internally toothed gear 2, a cup-shaped flexible externally toothed gear 3, and an elliptically-contoured wave generator 4. The externally toothed gear 3 is coaxially arranged inside the internally toothed gear 2. The strain wave gearing 1 is installed in an upright orientation so that the wave generator is located on the upper side. For example, the internally toothed gear 2 is fixed to a device housing 5 which is a fixed-side member located on the upper side, the wave generator 4 is fixedly connected to an input shaft 6 such as a motor rotational shaft located on the upper side, and the externally toothed gear 3 is fixedly connected to an output shaft 7a located on the lower side in a coaxial manner.

The externally toothed gear 3 is of a cup shape, and has a radially-flexible cylindrical body part 3a and external teeth 3b formed on an outer circumferential surface portion on the side of an open end of the cylindrical body part. A diaphragm 3c is formed so that it spreads radially and inward from the opposite end of the cylindrical body part 3a. An annular rigid boss 3d is formed on the inner peripheral edge of the diaphragm 3c. The boss 3d is sandwiched between an annular pressing member 7b and the output shaft 7a, and in this state, these three members are coaxially fastened and fixed by a plurality of fastening bolts 7c.

The wave generator 4 is provided with a rigid plug 4a and a wave-generator bearing 4b mounted on an elliptical-profile outer circumferential surface of the plug. The wave generator 4 is accommodated inside a portion of the cylindrical body part 3a of the externally toothed gear 3 where external teeth 3b are formed.

In an internal space of the cylindrical body part 3a of the externally toothed gear 3, there is formed a compartment section 9 sealed by the wave generator 4 mounted on the side of the open end of the cylindrical body part, and a cap 8 attached to the side of the boss 3d. The compartment section 9 is filled with lubricating fine powders 10 for lubricating each portion to be lubricated in the strain wave gearing 1. The lubricating fine powders 10 accumulate on the lower side portion of the compartment section 9 by the gravity in a stationary sate as shown in the drawing.

There are three main portions to be lubricated by the lubricating fine powders 10 in the strain wave gearing 1. Namely, an internal contact part 11 of the wave generator 4 (contact parts of the component parts of a wave-generator bearing 4b); a contact part 12 between the wave generator 4 and the externally toothed gear 3 (a contact part between the outer-ring outer circumferential surface of the wave-generator bearing 4b and the inner circumferential surface of the cylindrical body part 3a of the externally toothed gear 3); and tooth-surface parts 13 of the internally toothed gear 2 and the externally toothed gear 3.

Here, a first powder guide 20 is attached to the wave generator 4. The first powder guide 20 rotates integrally with the wave generator 4 inside the compartment section 9, whereby leading the lubricating fine powders 10 in the direction toward the internal contact part 11 and contact part 12 to be lubricated. A second powder guide 30 is also attached to the wave generator 4. The second powder guide 30 rotates integrally with the wave generator 4, whereby leading the lubricating fine powders 10, which passed through the wave generator 4 from the compartment section 9 and has being moving upward, in the direction toward the tooth-surface parts 13 to be lubricated.

Figure 2:
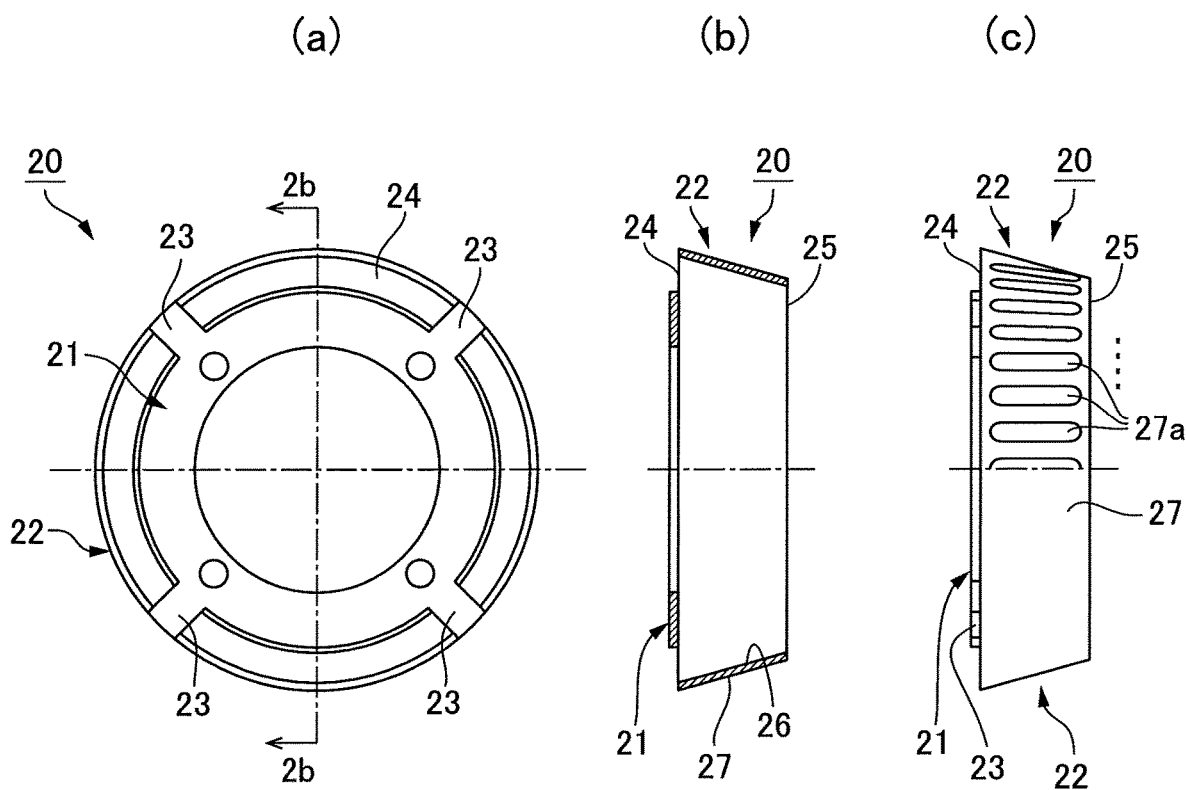
FIGS. 2a, b, c include a front view, a longitudinal sectional view and a side view showing an example of the first powder guide of FIG. 1.
Figure 3:
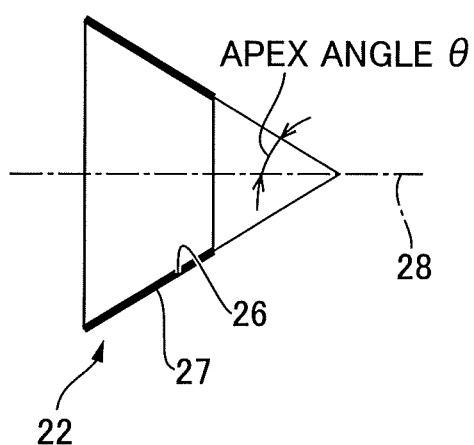
FIG. 3 is an explanatory view showing the apex angle of the first powder guide of FIG. 1.

FIG. 2(a) is a front view showing the first powder guide 20, FIG. 2(b) is a longitudinal sectional view of a part cut across 2b-2b line thereof, and FIG. 2(c) is a side view thereof. FIG. 3 is an explanatory view of a circular truncated cone shape of the first powder guide 20.

Explanation will be made with reference to FIGS. 1 and 2. A plug 4a of the wave generator 4 has an inner end face 4c facing the compartment section 9 located on the lower side, and a stepped outer end face 4d facing upward. The first powder guide 20 has an annular fixed plate portion 21 fixed coaxially to the outer-circumferential-side end-face portion of the inner end face 4c of the plug 4a, and a tubular body part 22 extending coaxially in the direction of the device center axis line 1a. A plurality of connecting plate portions 23 extend outward from the outer peripheral edge of the fixed plate portion 21 at prescribed angular intervals, and are connected to the tubular body part 22. In this example, four connecting plate portions 23 are formed at an angular interval of 90 degrees.

The tubular body part 22 has a circular truncated cone shape spreading outward from the lower side to the upper side. Specifically, it has the circular truncated cone shape that spreads outward as it comes close to the inner end face 4c of the plug 4a along the direction of the device center axis line 1a. In addition, the inner diameter of an upper end opening part 24 of the tubular body part 22 is larger than the outer diameter of the inner end face 4c of the plug 4a, and the outer diameter of the fixed plate portion 21 attached to the upper end opening part 24 via the connecting plate portions 23 is almost the same as the outer diameter of the inner end face 4c. The inner diameter of a lower end opening part 25 is larger than the outer diameters of the cap 8 and the pressing member 7b. The tubular body part 22 opens upward and downward in the compartment section 9.

Furthermore, as can be seen from FIG. 1, the lower half portion of the tubular body part 22 of the circular truncated cone shape is buried in the lubricating fine powders 10 accumulated in the compartment section 9. Therefore, the first powder guide 20 is maintained in a state being in contact with the lubricating fine powders 10 at all time.

The tubular body part 22 of the circular truncated cone shape has an inner circumferential surface 26 that is a smooth surface. The outer circumferential surface 27 of the tubular body part may be either one of a smooth surface as shown by the lower half portion and a concave/convex surface as shown by the upper half portion in FIG. 2(c). In this example, shallow oval grooves 27a of a constant width and a constant length are formed at a constant pitch along the circumferential direction.

As shown in FIG. 3, the inclination angle of the inner circumferential surface 26 and the outer circumferential surface 27 of the circular-truncated-cone-shape tubular body part 22 with respect to the center axis line 28, which is the apex angle θ of the circular truncated cone shape of the tubular body part 22, is desirably set to be in the range of 10 degrees to 30 degrees.

Referring back to FIG. 1, the second powder guide 30 is a disc-shaped member that is coaxially fixed to the outer-peripheral-side end-face portion of the stepped outer end face 4d of the plug 4a of the wave generator 4. The outer-peripheral-side portion of the second powder guide 30 is a guide plate portion 31 that faces the wave-generator bearing 4b from the opposite direction with respect to the compartment section 9, and the inner-peripheral-side portion is a fixed plate portion 32 that is fixed to the outer-peripheral-side end-face portion of the outer end face 4d. The device housing 5 is formed with an annular end face 5a facing the wave-generator bearing 4b. The guide plate portion 31 on the outer-peripheral side of the second powder guide 30 is located between the wave-generator bearing 4b and the annular end face 5a.

In the strain wave gearing 1 of the present example, the first powder guide 20 and the second powder guide 30 rotates integrally with the wave generator 4 at high speeds during a high-speed operation. By means of the centrifugal force generated by the rotation of the first powder guide 20, the lubricating fine powders 10 inside the first powder guide 20 ascend along the inner circumferential surface 26 of a cone shape toward the internal contact part 11 and the contact part 12 which are portions to be lubricated.

In addition, the lubricating fine powders 10 outside the first powder guide 20 are made to flow in the circumferential direction by the cone-shaped outer circumferential surface 27 of the first powder guide 20 which are rotating at high speeds. In particular, the lubricating fine powders 10 can be made to flow intensely in a case where the outer circumferential surface 27 is a concave/convex surface provided with the grooves 27a et al., as shown by the upper half portion in FIG. 2(c).

The externally toothed gear 3, which surrounds the first powder guide 20 rotating at a high speed, rotates at a reduced speed. Accordingly, a large speed difference is generated between the cone-shaped outer circumferential surface 27 of the first powder guide 20 and the circular inner circumferential surface 3e of the cylindrical body part 3a of the externally toothed gear 3. With this speed difference, the lubricating fine powders 10 flowing in the circumferential direction are made to ascend toward the internal contact part 11 and the contact part 12 along the circular inner circumferential surface 3e.

As a result, the lubricating fine powders 10 accumulated in the compartment section 9 are supplied to the internal contact part 11 (the wave-generator bearing 4b) and the contact part 12 (the contact part between the wave generator 4 and the externally toothed gear 3), and these parts are lubricated.

Furthermore, a part of the lubricating fine powders 10 supplied to the wave-generator bearing 4b passes through the raceway of the wave-generator bearing 4b, and flows upward. Likewise, a part of the lubricating fine powders 10 supplied between the wave generator 4 and the externally toothed gear 3 passes through between them, and flows upward.

The second powder guide 30, which is rotating integrally with the wave generator 4 at a high-speed, is arranged on the upper side of the wave-generator bearing 4b. Accordingly, the lubricating fine powders 10 after passed through to the upper side are led to the outer peripheral side by the guide plate portion 31 at the outer peripheral side of the second powder guide 30 which is rotating at a high speed, whereby they are supplied to the tooth surface parts 13 of the external teeth and the internal teeth to be lubricated.

Figure 4:
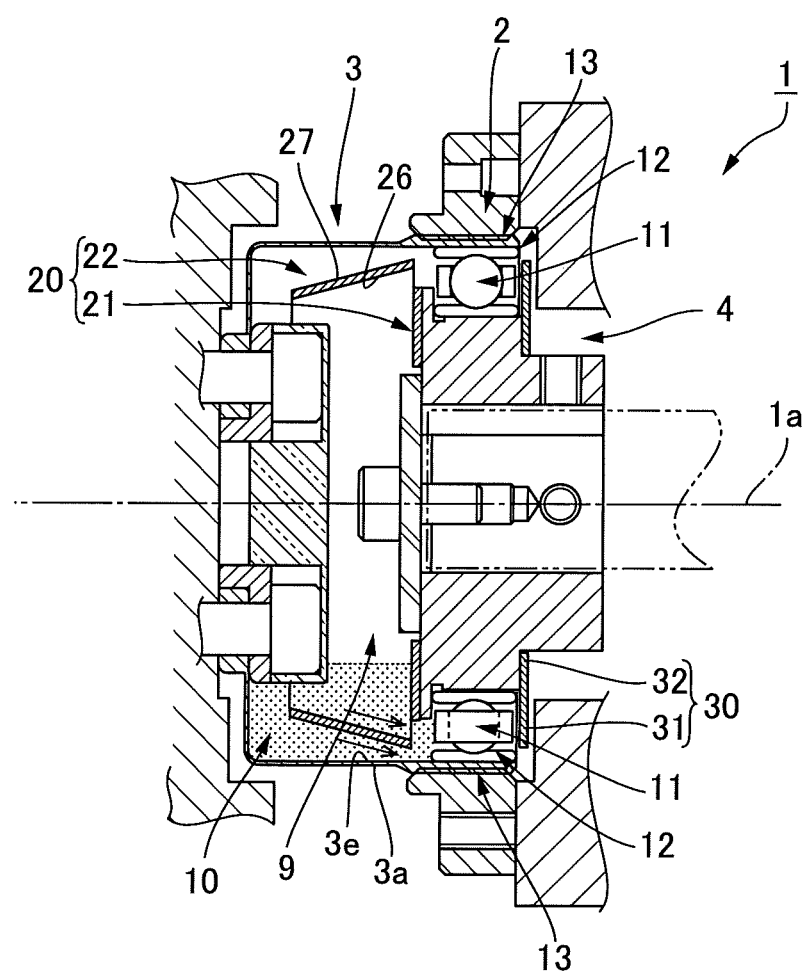
FIG. 4 is a schematic longitudinal sectional view showing a state of a horizontal orientation of the strain wave gearing of FIG. 1 so that the device center axis line is oriented in the horizontal direction.

Next, FIG. 4 is a schematic longitudinal sectional view showing a case where the strain wave gearing 1 is changed in its orientation from the upright orientation shown in FIG. 1 into a horizontal orientation in which the device center axis line 1a orients in the horizontal direction. In a stationary sate in the horizontal orientation where the device center axis line 1a orients in the horizontal direction, the lubricating fine powders 10 are in a state being accumulated, due to the gravity, on the portion of the circular body part 3a of the externally toothed gear 3 located on the lower side in the compartment section 9.

During operation in the horizontal orientation, the lubricating fine powders 10 inside the first powder guide 20 move in the circumferential direction along the cone-shaped inner circumferential surface 26 and further move toward the internal contact part 11 and the contact part 12 to be lubricated by means of the centrifugal force that is generated by the rotation of the first powder guide 20.

The lubricating fine powders 10 outside of the first powder guide 20 are made to flow in the circumferential direction by the cone-shaped outer circumferential surface 27 of the first powder guide 20 rotating at a high speed, and are made to move to the upper side in FIG. 4. The lubricating fine powder 10 flowing in the circumferential direction are made to move along the circular inner circumferential surface 3e toward the internal contact part 11 and the contact part 12 to be lubricated, which is caused by the large speed difference between the cone-shaped outer circumferential surface 27 of the first powder guide 20 and the circular inner circumferential surface 3e of the cylindrical body part 3a of the externally toothed gear 3.

To explain further, the gap between the cone-shaped outer circumferential surface 27 and the circular inner circumferential surface 3e becomes gradually narrow toward the direction of the internal contact part 11 and the contact part 12 to be lubricated. According to the speed difference between the outer circumferential surface 27 and the inner circumferential surface 3e, relatively fine powders of the lubricating fine powders 10 are led to the right side in the drawing (the side of the wave generator 4), whereas relatively coarse powders thereof are led to the left side. As a result, the relatively fine powders are preferentially supplied to the internal contact part 11 and the contact part 12 to be lubricated.

In addition, the lubricating fine powder 10 moving after passed through these internal contact part 11 and the contact part 12, are supplied to the tooth surface parts 13 of the external teeth and the internal teeth to be lubricated by means of the second powder guide 30 rotating integrally with the wave generator at a high speed.

As mentioned above, even if the orientation of the strain wave gearing 1 during operation is changed, the lubricating fine powders 10 accumulated in the compartment section 9 are stirred by the first powder guide 20, and are supplied toward the portions to be lubricated. Accordingly, it is possible to prevent reaggregation of the lubricating fine powders and lubricate each portion with certainty.

Other Embodiments

Figure 5:
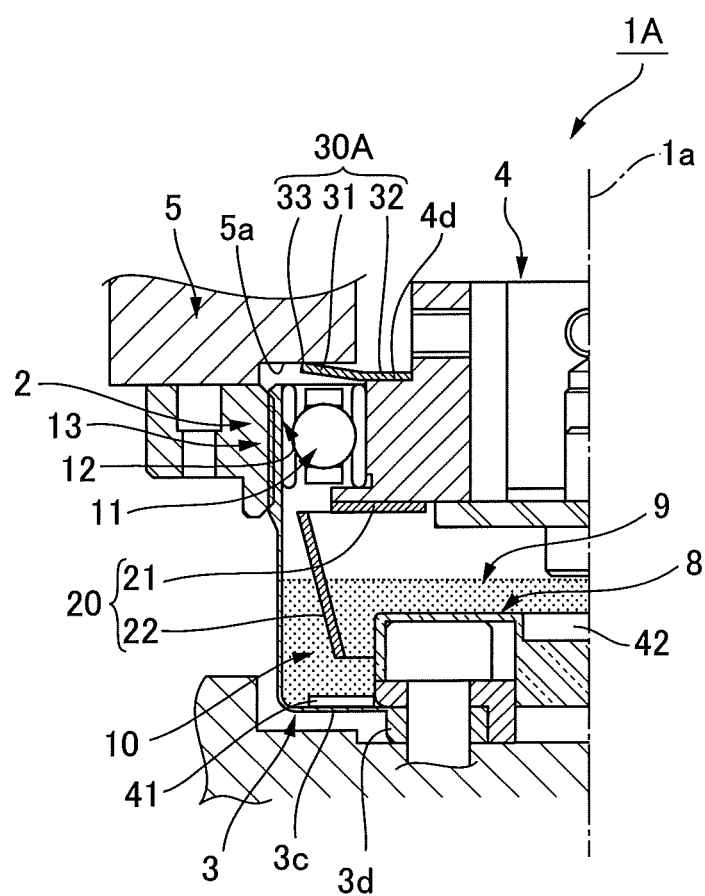
FIG. 5 is a schematic half longitudinal sectional view showing an example of a strain wave gearing to which the present invention is applied.

FIG. 5 is a schematic half longitudinal sectional view showing other example of the strain wave gearing to which the present invention is applied. Since the basic configuration of the strain wave gearing 1A shown in this drawing is the same as that of the previously described strain wave gearing 1, the corresponding sections in the drawing are denoted by the same reference numerals and the explanation thereof will be omitted.

The strain wave gearing 1A is provided with dehumidifying heaters 41 and 42. The heaters 41 and 42 can prevent or suppress the lubricating fine powders 10 from aggregation or degradation of lubricating performance due to moisture absorption. The heater 41 is an annular heater which is attached to the inner end face of the diaphragm 3c of the externally toothed gear 3, and the heater 42 is an annular heater which is attached to the center portion of the cap 8. Only one of the heaters can be used, and the heaters can be attached to another portion.

In addition, in the strain wave gearing 1A, the outer peripheral edge portion 33 of the outer-circumferential-side guide plate portion 31 of the second powder guide 30A is in contact with the annular end face 5a of the device housing 5 in a slidable manner. This allows to prevent or suppress the lubricating fine powders 10 from entering the side of the input shaft (not shown) through the second powder guide 30A and the device housing 5.

Figure 6:
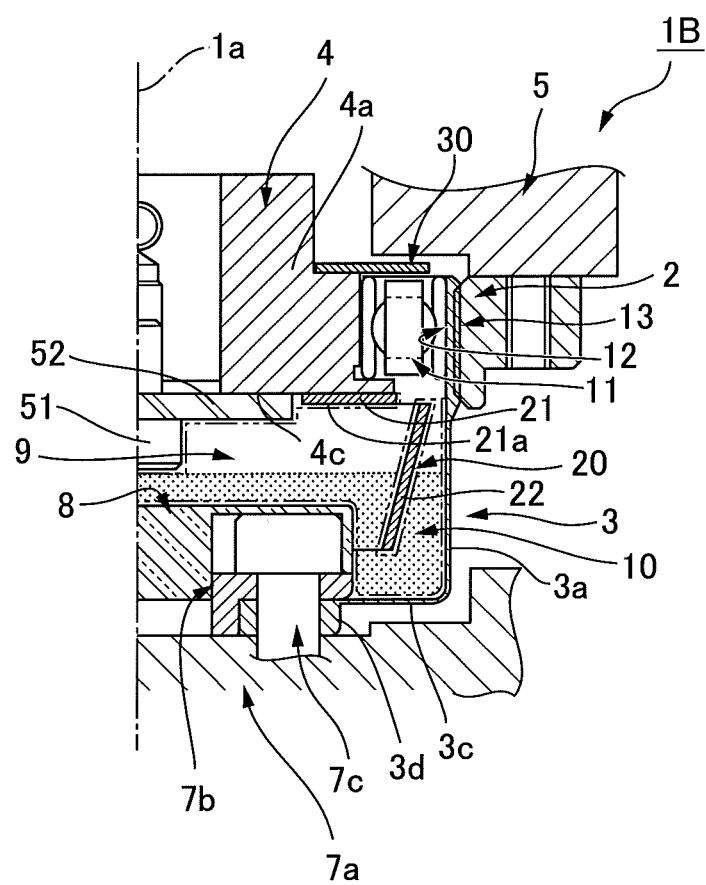
FIG. 6 is a schematic half longitudinal sectional view showing an example of a strain wave gearing to which the present invention is applied.

Next, FIG. 6 is a schematic half longitudinal sectional view showing another example of the strain wave gearing to which the present invention is applied. Since the basic configuration of the strain wave gearing 1B shown in this drawing is also the same as the previously described strain wave gearing 1, the corresponding sections in the drawing are denoted by the same reference numerals and explanation thereof is omitted.

In the strain wave gearing 1B of this example, the surface of the portions that face the compartment section 9 other than the internal contact part 11, the contact part 12 and the tooth surface parts 13 to be lubricated, are applied with a powder adhesion preventing coating, for example, a fluorine coating. In this example, the surface where the coating is applied is shown by imaginary lines. Specifically, the coated surfaces include the circular inner circumferential surface 3e of the externally toothed gear 3, the inner-side surface 21a of the fixed plate portion 21 of the first powder guide 20, the whole surface of the circular-truncated-cone-shaped tubular body part 22, the surface of the cap 8, surfaces of fastening bolts 51 and stop plates 52 and the like.

The invention claimed is:

1. A strain wave gearing comprising:
a rigid internally toothed gear;
a cup-shaped flexible externally toothed gear arranged coaxially inside the internally toothed gear;
a wave generator for flexing the externally toothed gear in a non-circular shape to partially mesh with the internally toothed gear, the wave generator being accommodated inside the externally toothed gear;
a lubricating powder filled in a compartment section enclosed by the externally toothed gear and the wave generator;
a first powder guide for rotating integrally with the wave generator in the compartment section to lead the lubricating powder in a direction toward an internal contact part of the wave generator and a contact part between the wave generator and the externally toothed gear; and
a second powder guide for rotating integrally with the wave generator to lead the lubricating powder after passed through the wave generator from the compartment section, toward a direction of tooth surface parts of the externally toothed gear and the internally toothed gear,
wherein:
the first powder guide has a tubular body part extending coaxially in a direction of a device center axis line,
the tubular body part opens on both ends in the direction of the device center axis line, and has a shape of a circular truncated cone that spreads outward in a radial direction as it approaches the inner-side end-face portion, and
each of an inner circumferential surface and an outer circumferential surface of the tubular body part is, at least in part thereof, in contact with the lubricating powder in the compartment section.

2. The strain wave gearing according to claim 1,
wherein the wave generator has an inner-side end-face portion facing the compartment section,
the first powder guide has a fixed part fixed to the inner-side end-face portion.

3. The strain wave gearing according to claim 2,
wherein an apex angle of the circular truncated cone shape of the tubular body part is in the range of 10 degrees to 30 degrees.

4. The strain wave gearing according to claim 2,
wherein a plurality of convex parts or a plurality of concave parts are formed in the outer circumferential surface of the tubular body part.

5. The strain wave gearing according to claim 1,
wherein the wave generator has a rigid plug and a wave-generator bearing mounted on a plug outer circumferential surface having a non-circular profile of the plug,
the internal contact part of the wave generator is contact portions among component parts of the wave-generator bearing,
the second powder guide is a disc-shaped member fixed coaxially to the plug,
the second powder guide has an outer-peripheral-side portion that faces a raceway of the wave-generator bearing from an opposite side of the compartment section in a direction of a device center axis line, and an inner-peripheral-side portion that is fixed to the plug.

6. The strain wave gearing according to claim 5, further comprising:
a fixed-side member to which the internally toothed gear is fixed,
wherein the outer-peripheral-side portion of the second powder guide is located, in the direction of the device center axis line, between the wave-generator bearing and an annular end surface formed on a fixed-side member, and
the outer-peripheral-side portion is in contact with the annular end face in a slidable manner.

7. A strain wave gearing comprising:
a rigid internally toothed gear;
a cup-shaped flexible externally toothed gear arranged coaxially inside the internally toothed gear;
a wave generator for flexing the externally toothed gear in a non-circular shape to partially mesh with the internally toothed gear, the wave generator being accommodated inside the externally toothed gear;
a lubricating powder filled in a compartment section enclosed by the externally toothed gear and the wave generator;
a first powder guide for rotating integrally with the wave generator in the compartment section to lead the lubricating powder in a direction toward an internal contact part of the wave generator and a contact part between the wave generator and the externally toothed gear;

a second powder guide for rotating integrally with the wave generator to lead the lubricating powder after passed through the wave generator from the compartment section, toward a direction of tooth surface parts of the externally toothed gear and the internally toothed gear; and a heater for dehumidifying the lubricating powder, the heater being arranged in the compartment section.

8. A strain wave gearing comprising:

a rigid internally toothed gear;

a cup-shaped flexible externally toothed gear arranged coaxially inside the internally toothed gear;

a wave generator for flexing the externally toothed gear in a non-circular shape to partially mesh with the internally toothed gear, the wave generator being accommodated inside the externally toothed gear;

a lubricating powder filled in a compartment section enclosed by the externally toothed gear and the wave generator;

a first powder guide for rotating integrally with the wave generator in the compartment section to lead the lubricating powder in a direction toward an internal contact part of the wave generator and a contact part between the wave generator and the externally toothed gear; and a second powder guide for rotating integrally with the wave generator to lead the lubricating powder after passed through the wave generator from the compartment section, toward a direction of tooth surface parts of the externally toothed gear and the internally toothed gear;

wherein at least a part of surface portions which are exposed to the lubricating powder is applied with a powder adhesion preventing coating, the surface portions being other than the internal contact part, the contact part and the tooth surface parts.

* * * * *